United States Patent

[11] 3,611,949

| [72] | Inventor | Israel D. Peisner |
| | | Huntington Woods, Mich. |
| [21] | Appl. No. | 844,872 |
| [22] | Filed | July 25, 1969 |
| [45] | Patented | Oct. 12, 1971 |
| [73] | Assignee | Whitehead & Kales Company |
| | | River Rouge, Mich. |

[54] SADDLE YOKE ASSEMBLY
14 Claims, 9 Drawing Figs.

[52] U.S. Cl........................................ 105/368 R,
  296/1 A
[51] Int. Cl........................................B65g 67/00,
  B60p 7/08
[50] Field of Search............................. 105/368;
  214/38; 296/1 A

[56] References Cited
UNITED STATES PATENTS

| 1,247,553 | 11/1917 | Linquist et al.............. | 105/368 |
| 1,735,800 | 11/1929 | Snyder........................ | 105/368 |
| 1,887,325 | 11/1932 | Pratt et al. .................. | 105/368 |
| 1,934,841 | 11/1933 | Copony....................... | 105/368 |
| 2,060,027 | 11/1936 | Butterworth................ | 105/368 |
| 3,465,691 | 9/1969 | Simmons..................... | 105/368 T |
| 3,511,392 | 5/1970 | Blunden et al............... | 214/38 |

*Primary Examiner*—Drayton E. Hoffman
*Attorney*—Whittemore, Hulbert & Belknap

ABSTRACT: This disclosure relates to saddle yokes for supporting the front ends of vehicles loaded in a simulated "saddleback" arrangement on a vehicle transport such as a railcar. Each saddle yoke has a pair of open substantially rectangular frames defining bottomless pockets adapted to receive the front wheels of a vehicle. Means, such as tiedown chains, and including improved chain locks are provided for holding the wheels down in the pockets.

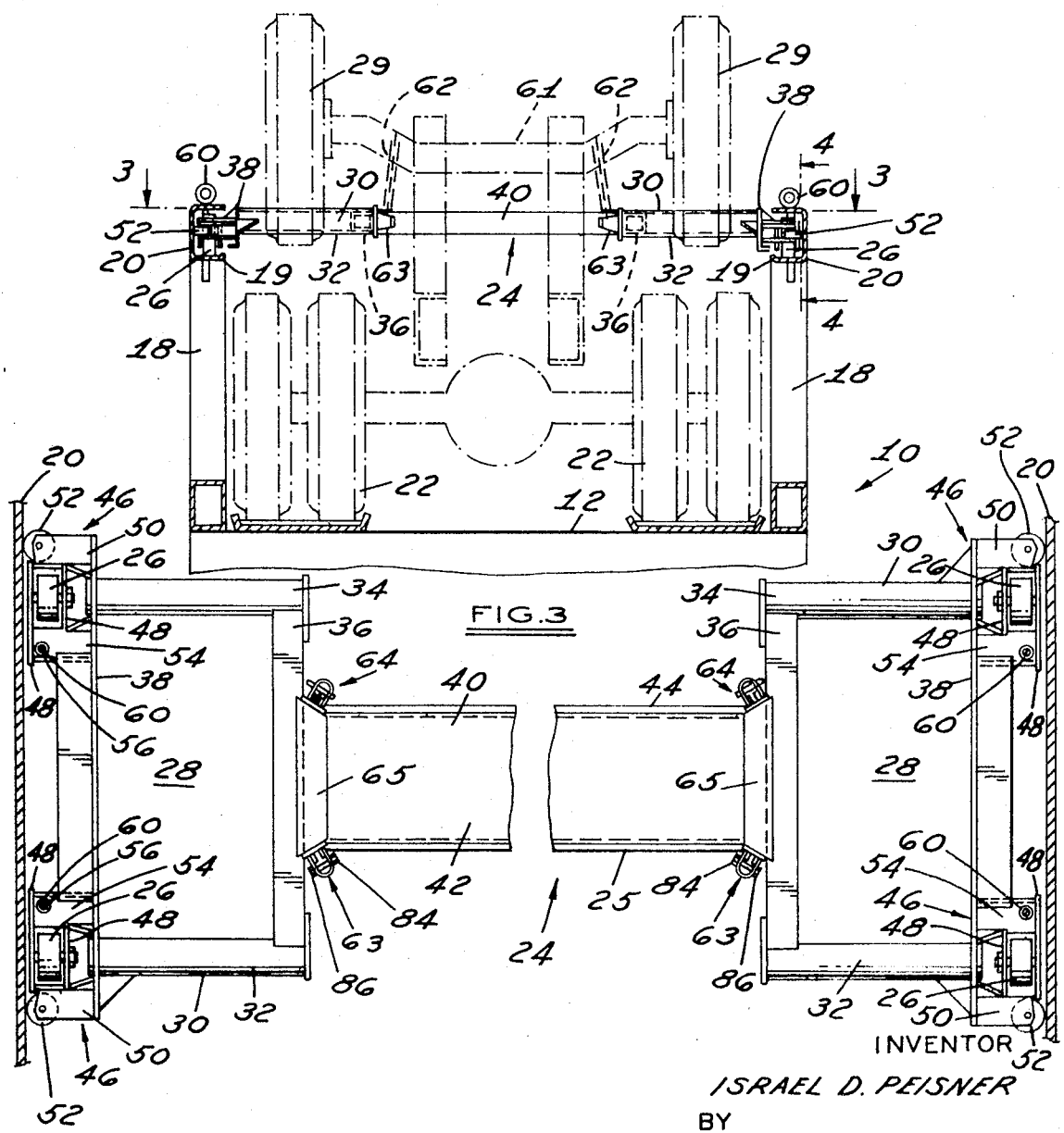

INVENTOR
*ISRAEL D. PEISNER*
BY
*Whittemore, Hulbert & Belknap*
ATTORNEYS

INVENTOR
ISRAEL D. PEISNER
BY
Whittemore, Hulbert & Belknap
ATTORNEYS

{ 3,611,949 }

SADDLE YOKE ASSEMBLY

BACKGROUND OF THE INVENTION

"Saddleback" loading is an arrangement of in-line vehicle loading, with the front end of each vehicle placed over and supported upon the rear chassis of the inclined vehicle in front of it. A simulated "saddleback" arrangement is shown in a copending application of Donald J. Blunden et al., Ser. No. 780,056, now Pat. No. 3,511,392 and assigned to the assignee of this application, in which the front ends of the vehicles are not supported upon the rear ends of the preceding vehicles, but instead are supported above and clear of the rear ends of the preceding vehicles by saddle yokes. The present invention relates to an improvement in the saddle yoke construction.

SUMMARY OF THE INVENTION

One object of this invention is to provide an improved wheel support for the front wheels of vehicles supported on a transport.

Another object is to provide an improved saddle yoke for supporting the front wheels of vehicles loaded on a transport in a simulated "saddleback" arrangement.

Another object is to provide a saddle yoke having a pair of upwardly opening bottomless pockets for supporting the front wheels of the vehicles loaded on a transport, the front and rear edges of the pockets being spaced apart less than the diameter of the wheels so as to engage the peripheries of the wheels at circumferentially spaced points and provide the sole support for the wheels.

Another object is to provide a saddle yoke in which the pockets are formed by open substantially rectangular frames.

Another object is to provide a tiedown arrangement including a chain and an improved chain lock to prevent the wheels of the vehicle from lifting out of the pockets.

Other objects and features of the invention will become apparent as the description proceeds, especially when taken in conjunction with the accompanying drawings, wherein:

FIG. 1 is a fragmentary side elevational view with parts in phantom lines showing a plurality of trucks loaded in a simulated "saddleback" arrangement on a rail car having their front ends supported by saddle yokes over the rear ends of the preceding vehicles, all in accordance with my invention.

FIG. 2 is a view partly in elevation and partly in section taken substantially on the line 2—2 of FIG. 1.

FIG. 3 is a fragmentary view partly in elevation and partly in section taken substantially on the line 3—3 of FIG. 2.

Figure 4:
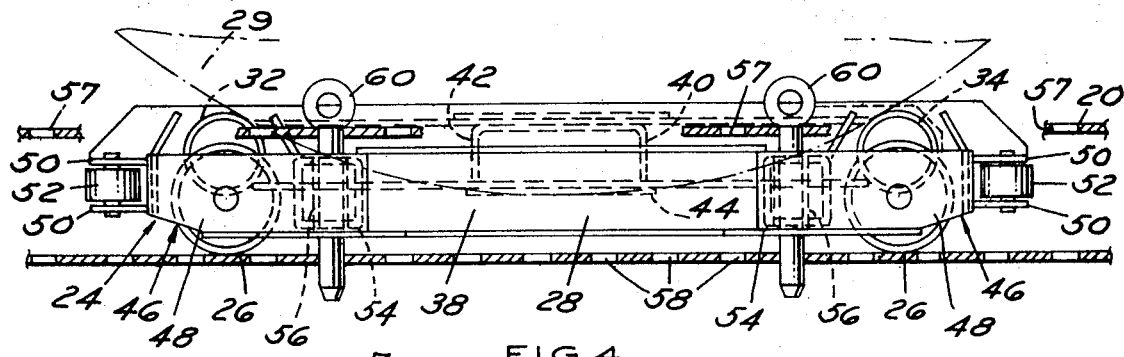
FIG. 4 is a fragmentary sectional view partly in elevation and partly in section taken substantially on the line 4—4 of FIG. 2.

Referring now more particularly to the drawings and especially to FIGS. 1-7, the vehicle transport is specifically shown as a railcar 10 although it might be some other type of transport, such for example as a highway trailer.

The railcar 10 has an elongated generally horizontal deck or bed structure 12 extending lengthwise of the railcar and supported on the usual wheels 14 adapted to run on tracks 16. A plurality of vertical side rail supports 18 rise from the deck 12 in two rows extending lengthwise of the railcar on opposite sides thereof. Laterally spaced tracks 20 are secured to and extend along the tops of the side rail supports 18 in two rows lengthwise of the rail car. These tracks are parallel to one another and preferably horizontal throughout their lengths and open at both ends to permit vehicle loading and unloading from either end of the railcar. The tracks 20 are of the substantially C-shaped cross section shown in FIG. 2 with the open sides of the C facing toward one another and preferably with an upturned flange 19 along the lower inner edge of each track. As will be apparent in FIG. 2, the width of the deck 12 and the spacing between the uprights 18 and tracks 20 is greater than the width of the wheels of the vehicles or trucks 1, 1A, 1B, etc. to be carried on the railcar.

The trucks 1, 1A, 1B, etc. are adapted to be loaded on the railcar in a simulated "saddleback" arrangement as shown in FIG. 1 with the front end of each truck raised and placed above the rear chassis 21 and wheels 22 of the inclined truck immediately in front of it. The front ends of the trucks are held in raised position by saddle yokes 24.

Each saddle yoke 24 is in the form of a transverse frame structure 25 extending across the width of the railcar and having rollers 26 at the ends engaging the tracks 20. Each frame structure 25 is constructed to provide a pair of bottomless pockets 28 adapted to receive the front wheels 29 of a truck. More specifically, each pocket is defined by an open rectangular frame 30 having the parallel front and rear transverse members 32 and 34. The inner ends of members 32 and 34 are connected by the longitudinally extending frame member 36 and the outer ends are connected by the plate 38 which is parallel to the longitudinal member 36. These members 32, 34, 36 and 38 define the open bottomless pockets 28 in which the front vehicle wheels 29, more specifically the tires of such wheels, are received. The spacing between the front and rear transverse members 32 and 34 is less than the diameter of the wheels, but these members are spaced far enough apart so that the wheels are fairly deeply received in the pockets. These transverse members 32 and 34 provide the sole support for the front vehicle wheels in view of the fact that the pockets have no bottoms.

A transverse bar 40 preferably composed of the channel 42 and bottom plate 44, is permanently secured at its ends to the inner frame members 36 to provide a rigid saddle yoke assembly.

The plates 38 of the saddle yokes have roller housings 46 rigidly mounted on the outboard sides thereof. These housings include the spaced plates 48 on which the rollers 26 are journaled. Rollers 26 turn freely on horizontal axes and are adapted to roll on the bottom flanges of tracks 20. Vertically spaced horizontal plates 50 carried by housings 46 mount the guide rollers 52 for free rotation on vertical axes. Rollers 52 are adapted to engage the vertical webs of tracks 20, guide the movement of the saddle yokes and keep them from cocking at an acute angle with respect to the tracks.

The roller housings 46 also include the members 54 which have aligned vertical openings in which the vertical tubular pin guides 56 are mounted. Each track 20 has a plurality of holes 57 in its upper flange spaced apart uniformly from end to end of the track and a plurality of holes 58 in its lower flange respectively vertically aligned with the holes 57. Lock pins 60 are adapted to be extended through the pin guides 56 and aligned track holes 57 and 58 to lock the saddle yokes in adjusted position along the length of the railcar. If desired, chains may be provided to attach the lock pins 60 to the saddle yoke. Ordinarily only one lock pin will be used for each side of a saddle yoke although two are shown in FIG. 4.

In order to tie down the front ends of the vehicles so that the wheels 29 do not lift out of the pockets 28, tiedown chains 62 are provided, preferably two for each front axle 61. These tiedown chains are looped over the front axles 61. The two portions of each chain extending down from an axle are secured to a saddle yoke by the chain locks 63 and 64. There is a gusset plate 65 at each end of the transverse bar 40 of each saddle yoke to which a chain lock 63 and a chain lock 64 are secured.

The chain locks 63 and 64 are of the same construction except for the lockpin. Each chain lock comprises a bracket having an open frame consisting of a base plate 66 and a U-shaped plate 68 the ends of whose parallel legs are permanently secured to the base plate. A pair of lugs 70 are rigidly secured to the bracket within the open frame in contact with the base plate 66 and with the legs of the U-shaped plate 68. These lugs 70 are elongated members and extend in spaced parallel relation to each other from the base plate 66 toward the curved portion of plate 68 to provide the open-ended slot 71.

The chains 62 are of the link type as shown, and the width of the slot 71 between the lugs is slightly greater than the thickness of the links but substantially less than the width of the links.

Figure 5:
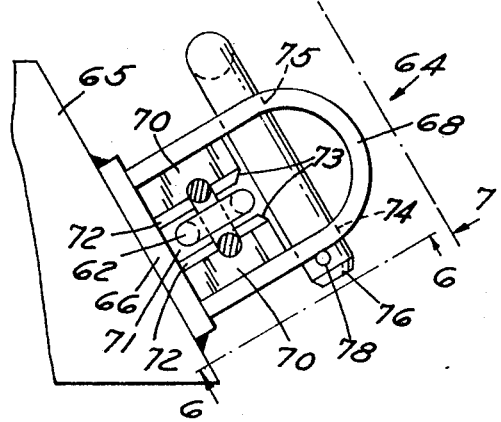
FIG. 5 is an enlarged view of a portion of FIG. 3, showing the improved chain lock.
Figure 6:
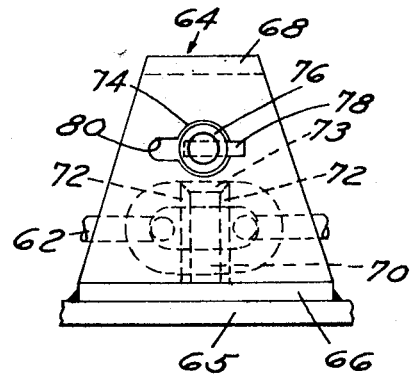
FIG. 6 is a view of the chain lock taken substantially on the line 6—6 of FIG. 5.
Figure 7:
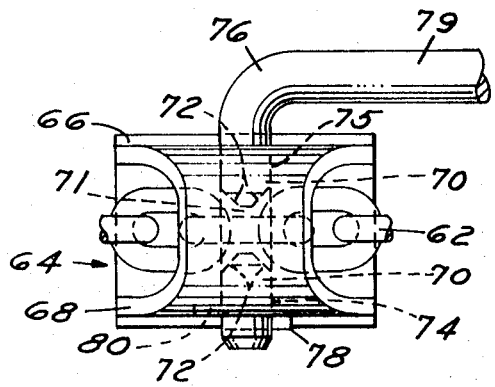
FIG. 7 is a view of the chain lock taken substantially on the line 7—7 of FIG. 5.

The lugs 70 extend only about one-half the length of the U-shaped plate 68 so that the curved end portion of the open frame beyond the lugs provides an unobstructed space through which the link chain may be extended. The link chain may then be inserted laterally into the slot 71 between the lugs as shown in FIGS. 5, 6 and 7, with the inserted link parallel to the lugs. It will be noted that the adjacent longitudinal edges 72 of the lugs are beveled top and bottom to roughly match the contours of the links of the chain both above and below the slot 71. The ends 73 of the lugs are also beveled to pilot the chain during its insertion into the slot. It will be obvious that when inserted into slot 71 between the lugs, the chain will be held in tension and cannot be withdrawn except by a lateral movement.

In order to prevent the lateral withdrawal of a chain inserted between the lugs, aligned holes 74 and 75 are provided in the legs of the U-shaped plate 68 beyond the ends of the lugs, and a lockpin is inserted through the holes across the open frame. The lockpin for chain lock 64 is designated 76. The portion of the lockpin 76 within the frame is close to the open ends of the slot 71 and thus prevents the chain from being withdrawn laterally. A retainer or stop pin 78 is secured in a hole in a projecting end of the lockpin 76 and extends radially outwardly from the lockpin to normally prevent the lockpin from being withdrawn. However, a radial key slot 80 in the hole 74 will clear the stop pin 78 when the two are aligned, to permit the lockpin 76 to be withdrawn from blocking relation to the chain held between lugs 70. The hole 75 does not have a similar key slot and therefore it will be obvious that the lockpin 76 cannot be completely withdrawn from the chain lock but only retracted far enough to unblock the open end of the slot 71.

The lockpin 76 has a handle portion 79 at right angles to the main body of the pin, which extends radially from the main body of the pin in the same direction as the stop pin 78. This handle portion will normally hang down by gravity, and since the key slot 80 projects in an upward direction, the lockpin 76 will not accidentally become disengaged from hole 74 and shift to a retracted position.

The lockpin 84 of chain lock 63 is shown as being in the form of a bolt. The bolt 84 extends through holes 74 and 75 in the U-shaped plate 68 of the bracket in blocking position with respect to the open end of the slot 71 between lugs 70. Since normally it is unnecessary to disconnect the chain from both chain locks, the bolt 84 is more or less permanently secured by a locknut 86. The locknut can, of course, be removed when it is desired to remove the bolt 84 and release the chain.

The pockets 28 of the saddle yokes 24 are deep enough to prevent the vehicle wheels supported therein from shifting forwardly or rearwardly. Therefore, the chains 62 do not have to be placed under a great deal of tension to hold the vehicles. Simple manual tension is enough to keep the front wheels from lifting out of the pockets. Since the lugs 70 extend at right angles to the direction of pull on the chain 62, it will be obvious that there will be no loss of tension when the chain is slipped between the lugs.

Since both ends of tracks 20 are open, the trucks may be loaded or unloaded from either end of the railcar. Suitable apparatus may be provided for this purpose such as the apparatus shown in the copending Pat. application Ser. No. 780,056 previously referred to. As already noted, the trucks are preferably supported on the railcar in a simulated "saddleback" arrangement. The saddle yokes 24 supporting the front wheels of the trucks may be moved along the tracks 20 to the desired position at which point they are locked in position by the lockpins 60. The chains 62 are tensioned to tie down the front axles with respect to the saddle yokes 24 either after the saddle yokes have been locked in adjusted position or at some prior stage in the loading. No additional tiedown means for the vehicles is required. As noted, the front end of each inclined truck, except the first in line, is preferably supported over and clear of the rear chassis and wheels of the truck in front of it. Since the trucks are not supported upon one another but are individually secured in a simulated "saddleback" arrangement, the trucks may be unloaded from either end of the railcar.

Figure 8:
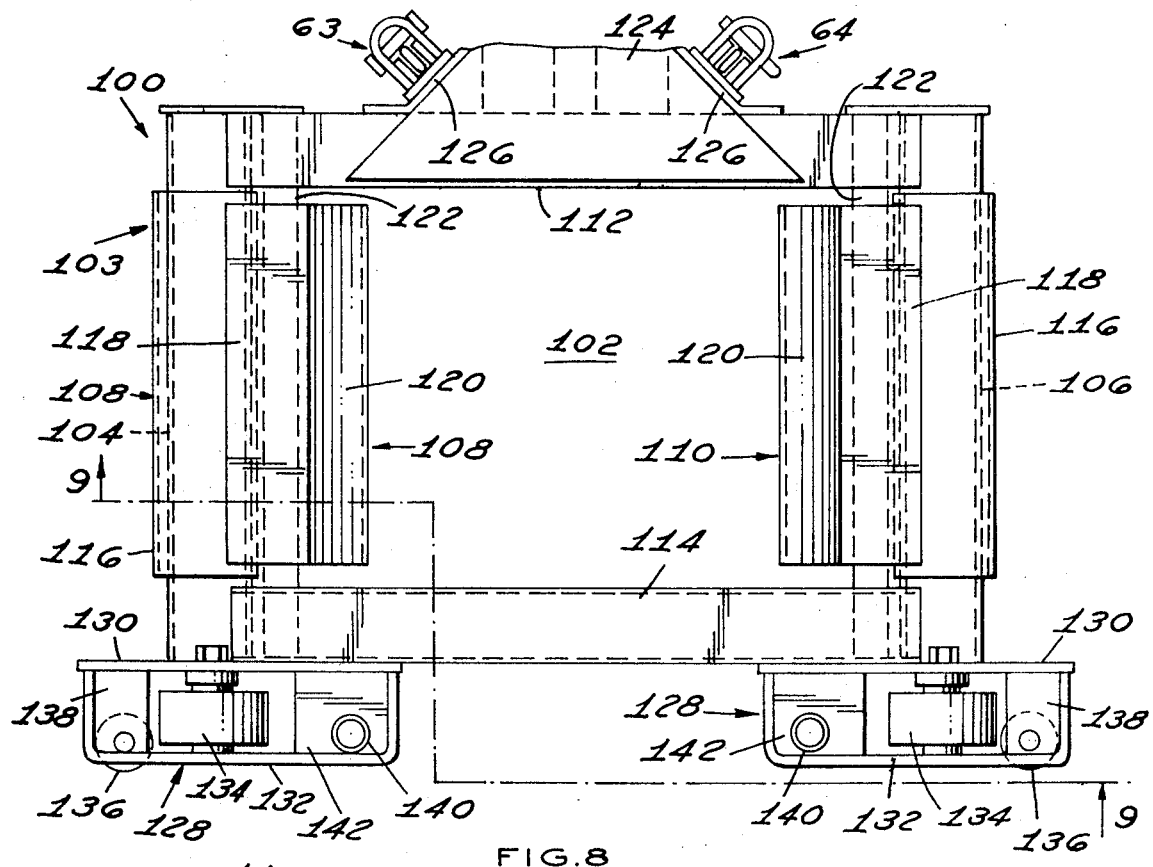
FIG. 8 is a fragmentary plan view showing a portion of a saddle yoke having a modified construction.
Figure 9:
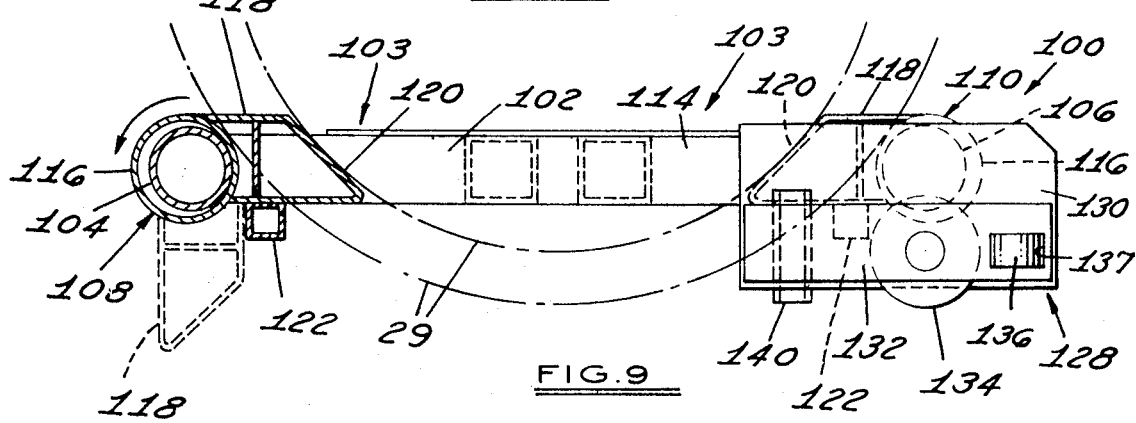
FIG. 9 is a view partly in elevation and partly in section taken substantially on the line 9—9 of FIG. 8.

FIGS. 8 and 9 illustrate a modified saddle yoke assembly in which the essential difference is in the pocket construction which is adjustable to accommodate different size wheels. The saddle yoke illustrated in FIGS. 8 and 9 is generally designated 100 and is in the form of a transverse frame structure constructed to provide a pair of bottomless pockets 102. FIG. 8 shows only one side of the saddle yoke comprising a pocket and associated structure including rollers, chain locks, etc. connected to one end of transverse center bar 124, but it will be understood that the pocket and associated structure connected to the other end of the transverse bar 124 is a mirror image of that shown. Each pocket is defined by an open rectangular frame 103 having the front and rear transverse cylindrical members 104 and 106 upon which the wheel supports 108 and 110 are mounted. The wheel supports 108 and 110 provide the sole support for wheels received in the pockets. The members 104 and 106 are parallel to one another and have their inner ends connected together by the longitudinally extending frame member 112 and their outer ends connected by the longitudinally extending frame member 114 which is parallel to the member 112. The wheel supports 108 and 110 consist of cylinders 116 loosely sleeved over the transverse members 104 and 106, and the wheel-supporting portions 118 which are welded or otherwise permanently secured to the cylinders 116. The cylinders 116 are larger in diameter than members 104 and 106 and freely rotatable thereon. The wheel-supporting portions 118 have the configuration illustrated in FIG. 9 and provide the inclined tire-engaging surfaces 120.

An elongated stop bar 122 secured at its ends to the longitudinal frame members 112 and 114 provides a stop to support the wheel supports 108 and 110 in the solid line positions of FIG. 9 for the support of a relatively small diameter wheel. The left-hand wheel support in FIG. 9 is shown in dotted lines turned counterclockwise to a second position in which it is disposed in an inoperative position. In this position of the wheel support 118, the vehicle wheel in the pocket will rest upon and be supported by the surface of the cylinder 116. It is obvious and be that if one only of the wheel supports 108, 110 is turned to the inoperative position shown in dotted lines in FIG. 9 an intermediate size wheel may be supported in the pocket, and that if both wheel supports 108, 110 are turned outward to the dotted line position shown in FIG. 9 the pocket will be enlarged to support a relatively large size wheel.

The open rectangular frames defining the two pockets are connected by a suitable transverse bar 124, and corner gussets 126 at each end of the transverse bar 124 support chain locks 63, 64, which may be identical to the ones previously described, for securing the chains employed to tie down the front axle and prevent the wheels from raising out of the pockets.

The roller housings 128 for the saddle yokes are made up of plates 130 secured to the longitudinal frame members 114 and U-shaped housing members 132 having their ends secured to the plate 130. The rollers 134 which are adapted to roll on the bottom flanges of tracks 20 are journaled for rotation on horizontal axes on the plates 130 and housing members 132. The guide rollers 136 for guiding the saddle yokes during movement along the tracks 20 by engagement with the upright webs of the tracks are journaled for free rotation on vertical axes in housing plates 138. Guide rollers 136 project through openings 137 in housing members 132. The pin guide tubes 140 for receiving the lock pins 60 by means of which the saddle yokes are secured in adjusted positions lengthwise of the tracks are disposed vertically and carried by housing plates 142.

It will be understood that a plurality of the saddle yokes shown in FIGS. 8 and 9 may be used instead of those shown in FIGS. 1–7 to support vehicles in a simulated "saddleback" arrangement on a transport, or that saddle yokes of both constructions may be used.

In certain of the claims which follow, reference is made to the vehicle front wheels as being received in the pockets 28. The use of the term "wheels" should be understood to include the tires on the wheel rims since it is the tires which are actually supported in the pockets.

The pockets in both saddle yoke assemblies described above receive the wheels deeply enough to completely restrain the vehicles from moving longitudinally. Since the tiedown chains are not needed for longitudinal restraint, they do not have to be heavily tightened by ratchets or the like. They may be simply placed under sufficient manual tension to prevent the wheels from lifting out of the pockets.

What I claim as my invention is:

1. An elongated vehicle transport having means for supporting a line of vehicles thereon, said vehicle-supporting means including supports for the front wheels of the vehicles, said supports having upwardly open pockets adapted to receive said wheels, said pockets having front and rear transverse members defining the front and rear margins of said pockets and spaced apart less than the diameter of said wheels to engage the peripheries of said wheels at circumferentially spaced points so as to support said wheels and longitudinally restrain the vehicles, at least one transverse member associated with each pocket including a wheel support mounted for movement between first and second positions, each wheel support having a first wheel-engaging portion disposed to engage a wheel received in the associated pocket in said first position of said wheel support and having a second wheel-engaging portion disposed to engage a wheel received in the associated pocket in said second position of said wheel support, said first position of each wheel support in said first position thereof being closer to the other transverse member of the associated pocket than said second portion in said second position of said wheel support, and means for holding said wheels in said pockets against upward movement.

2. An elongated vehicle transport having means for supporting a line of vehicles thereon, said vehicle-supporting means including supports for the front wheels of the vehicles, said supports having upwardly open pockets adapted to receive said wheels, said pockets having front and rear transverse members defining the front and rear margins of said pockets and spaced apart less than the diameter of said wheels to engage the peripheries of said wheels at circumferentially spaced points so as to support said wheels and longitudinally restrain the vehicles, and means for holding said wheels in said pockets against upward movement, said holding means including linear members, and means securing said linear members including brackets each having laterally spaced lugs defining a slot for receiving and retaining a portion of a linear member therein, said slots being open at one end to permit the lateral insertion of the linear members, and retractable members carried by said brackets blocking lateral withdrawal of the linear members from the open ends of said slots, said retractable member being retractable to positions clearing said open ends of said slots.

3. An elongated vehicle transport having means for supporting a line of vehicles thereon, said vehicle-supporting means including supports for the front wheels of the vehicles, said supports having upwardly open pockets adapted to receive said wheels, said pockets having front and rear transverse members defining the front and rear margins of said pockets and spaced apart less than the diameter of said wheels to engage the peripheries of said wheels at circumferentially spaced points so as to support said wheels and longitudinally restrain the vehicles, and means for holding said wheels in said pockets against upward movement, said holding means including link chains, and means for securing said chains including brackets which comprise open frames respectively receiving said chains, spaced lugs secured within each frame defining a slot for receiving and retaining a portion of a chain therein, said slots being open at one end to permit the lateral insertion of the chains, and retractable members carried by said frames and extending across the open ends of said slots to block lateral withdrawal of the chains from the open ends of said slots, said retractable members being retractable to positions clearing said open ends of said slots.

4. The transport defined in claim 3, wherein said lugs of each bracket extend in parallel relation across the frame thereof from one end of said frame toward the opposite end thereof terminating short of said opposite end, and said retractable member of each bracket extends across the frame thereof from side to side.

5. In combination, a vehicle transport having an elongated deck, parallel tracks extending lengthwise of said deck, a plurality of saddle yokes extending between and engaging said tracks for movement lengthwise of said deck, each saddle yoke having a pair of upwardly opening bottomless pockets adapted to receive the front wheels of a vehicle, said saddle yokes each comprising a pair of open substantially rectangular frames defining the pockets thereof, a frame member rigidly connecting the open frames of each saddle yoke member, said open frames having front and rear transverse members defining the front and rear margins of said pockets and spaced apart less than the diameter of said wheels to engage the peripheries of said wheels at circumferentially spaced points so as to provide the sole support for said wheels and the sole means for longitudinally restraining the vehicles, and means for holding said wheels against upward movement with respect to said pockets, said transverse members each including a tubular wheel support mounted for rotation between first and second positions, each wheel support having a first wheel-engaging portion disposed to engage a wheel received in the associated pocket in said first position of said wheel support and having a second wheel-engaging portion disposed to engage a wheel received in the associated pocket in said second position of said wheel support, said first portion of each wheel support in said first position thereof being closer to the other wheel support of the associated pocket than said second portion in said second position thereof.

6 In combination, a vehicle transport having an elongated deck, parallel tracks extending lengthwise of said deck, a plurality of saddle yokes extending between and engaging said tracks for movement lengthwise of said deck, each saddle yoke having a pair of upwardly opening bottomless pockets adapted to receive the front wheels of a vehicle, said pockets having front and rear transverse members defining the front and rear margins of said pockets and spaced apart less than the diameter of said wheels to engage the peripheries of said wheels at circumferentially spaced points so as to provide the sole support for said wheels and the sole means for longitudinally restraining the vehicles, and means for holding said wheels against upward movement with respect to said pockets, said holding means including link chains, and means for securing said chains to said saddle yokes including brackets secured to said saddle yokes and comprising open frames respectively receiving said chains, spaced lugs secured to each bracket within the frame thereof defining a slot for receiving and retaining a portion of a chain therein, said slots being open at one end to permit the lateral insertion of the chains, and retractable members carried by said brackets and extending across said open ends of said slots within the frames thereof to block lateral withdrawal of the chains from the open ends of said slots, said retractable members being retractable to positions clearing said open ends of said slots.

7. The combination defined in claim 6, wherein said lugs of each bracket extend in parallel relation across the frame thereof from one end of said frame toward the opposite end thereof terminating short of said opposite end, said lugs being spaced apart a distance less than the width of the chain links but more than the thickness thereof, and said retractable member of each bracket extending across the frame thereof from side to side adjacent the open end of the slot between said lugs.

8. The combination defined in claim 7, wherein the retractable member associated with at least one of the brackets secured to each saddle yoke comprises an elongated pin extending through aligned openings in the sides of said one bracket, said pin being retractable outwardly, a radially projecting retainer on the inner end of said pin preventing accidental outward retraction thereof, the innermost one of said aligned openings having a radial slot clearing said retainer in one angular position of said pin to permit outward retraction thereof, the outermost one of said aligned openings not clearing said retainer so as to prevent separation of said pin from its bracket, said pin having means on the outer end preventing inward retraction thereof.

9. The combination defined in claim 8, wherein said last-mentioned means comprises a handle projecting radially from said pin in the same direction as said retainer so that both normally extend in a downward direction by gravity force acting upon said handle, and said radial slot projects upwardly.

10. A bracket assembly for securing a link chain comprising an open frame having laterally spaced lugs defining a slot adapted to receive and retain a portion of a chain therein, said lugs being secured within said frame and extending in parallel relation across said frame from one end toward the opposite end thereof terminating short of said opposite end, said slot being open at one end to permit the lateral insertion of the chain, and a retractable member carried by and extending across said frame from side to side thereof, said retractable member comprising an elongated pin extending through aligned openings in the sides of said frame across the open end of said slot to block the lateral withdrawal of the chain, said pin being retractable outwardly to a position clearing said open end of said slot, a radially projecting retainer on the inner end of said pin preventing accidental outward retraction thereof, the innermost one of said aligned openings having a radial slot clearing said retainer in one angular position of said pin to permit outward retraction thereof, the outermost one of said aligned openings not clearing said retainer so as to prevent separation of said pin from said frame, and means on the outer end of said pin preventing inward retraction of said pin.

11. The bracket defined in claim 10, wherein said means on the outer end of said pin comprises a radially extending handle extending from said pin in the same direction as said retainer so that both said handle and said retainer normally extend downwardly by the force of gravity acting on said handle, said radial slot extending in an upward direction.

12. The bracket defined in claim 10, wherein said means on the outer end of said pin comprises a handle extending radially from said pin and normally extending downwardly by the force of gravity acting on said handle, said retainer, in the position said pin assumes when said handle extends downwardly, being displaced angularly from said radial slot.

13. A bracket assembly for securing a link chain comprising a bracket having means defining an elongated slot for receiving and retaining a portion of the chain therein, means closing one end of said slot, said slot being open at the opposite end to permit the lateral insertion and withdrawal of the chain, a retractable member carried by said bracket and extending across the open end of said slot to normally block the lateral withdrawal of the chain, said retractable member being axially slidably mounted in aligned openings in said bracket, said retractable member being retractable in an outward direction, a radially projecting retainer on the inner end of said retractable member preventing accidental outward retraction thereof, the innermost one of said aligned openings having a radial slot clearing said retainer in one angular position of said retractable member to permit outward retraction thereof, the outermost one of said aligned openings not clearing said retainer so as to prevent separation of said retractable member from said bracket, and means on the outer end of said retractable member preventing inward retraction thereof.

14. A bracket assembly for securing a link chain comprising an open frame including a generally U-shaped member having spaced parallel legs, a base extending across and secured to the ends of the legs of said U-shaped member, laterally spaced lugs secured within said frame and extending in parallel relation along said legs from said base toward the return-bent portion of said U-shaped member but terminating short of the latter, said lugs defining a slot adapted to receive and retain a portion of a chain therein, said slot being open at the end opposite said base to permit the lateral insertion and withdrawal of the chain, and a retractable member extending across the open end of said slot to normally block the lateral withdrawal of the chain, said retractable member being axially slidably mounted in aligned openings in the legs of said U-shaped member and being retractable to a position clearing the open end of said slot to permit the lateral withdrawal of the chain.